July 3, 1956

C. W. TAYLOR 2,752,630

FILM TENSILIZER

Filed May 27, 1952

INVENTOR.
CHARLES W. TAYLOR

BY

*R. L. Miller*
ATTORNEY

July 3, 1956

C. W. TAYLOR 2,752,630

FILM TENSILIZER

Filed May 27, 1952

INVENTOR.
CHARLES W. TAYLOR

BY

R. L. Miller
ATTORNEY

July 3, 1956
C. W. TAYLOR
2,752,630
FILM TENSILIZER
Filed May 27, 1952
4 Sheets-Sheet 3
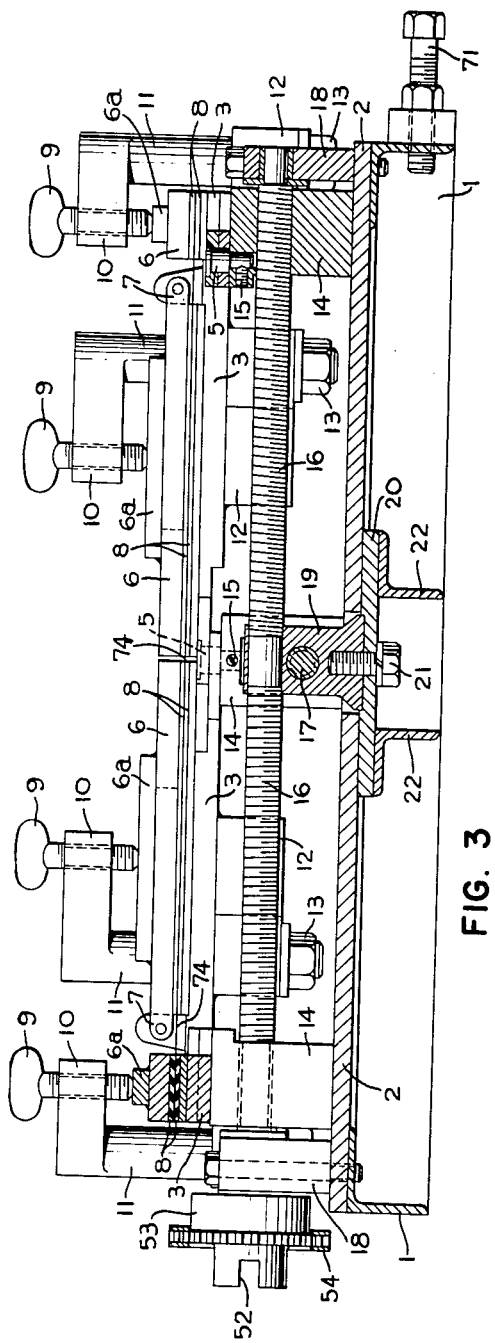
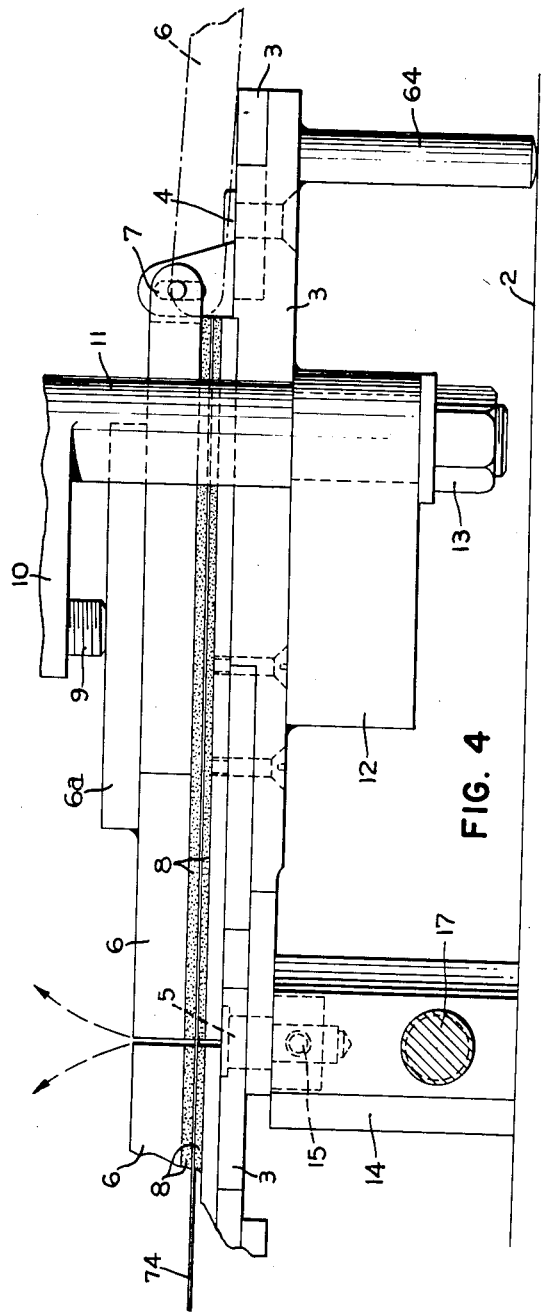
INVENTOR.
CHARLES W. TAYLOR
BY
R. L. Miller
ATTORNEY July 3, 1956 C. W. TAYLOR 2,752,630
FILM TENSILIZER
Filed May 27, 1952 4 Sheets-Sheet 4
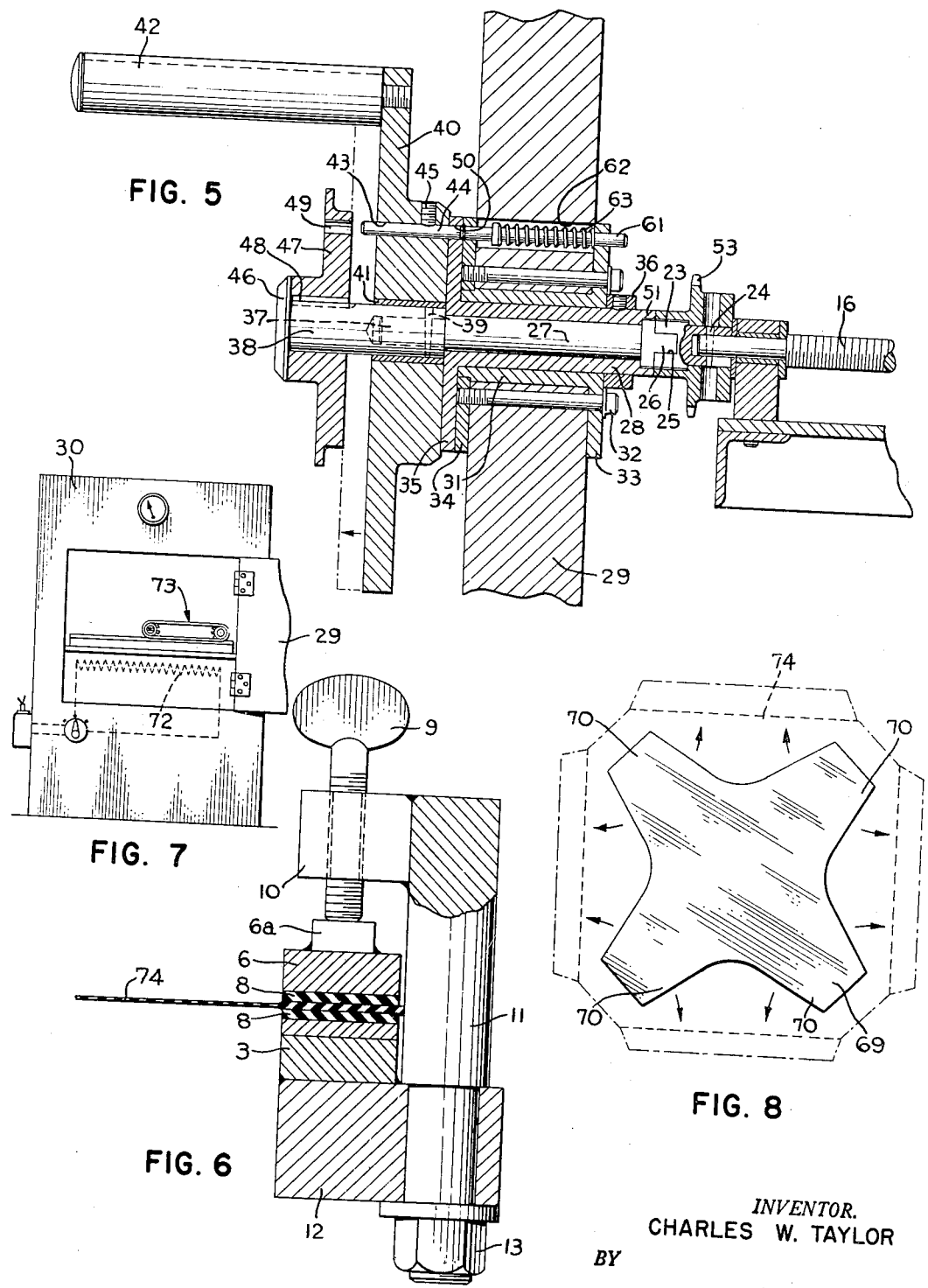
INVENTOR.
CHARLES W. TAYLOR
BY
R. L. Miller
ATTORNEY

United States Patent Office 2,752,630
Patented July 3, 1956

2,752,630

FILM TENSILIZER

Charles W. Taylor, Ravenna, Ohio, assignor to Wingfoot Corporation, Akron, Ohio, a corporation of Delaware Application May 27, 1952, Serial No. 290,125

13 Claims. (Cl. 18—1)

This invention relates to tensilizers and particularly to an apparatus for tensilizing thermoplastic films to determine the proper amount of stretch which is suitable for the particular purpose for which it is used.

The apparatus may be employed for tensilizing various thermoplastic films used for decorative purposes and is particularly effective in tensilizing films composed of a rubber hydrochloride used for wrapping various articles of food and the like.

An object of the present invention is to provide an apparatus for tensilizing thermoplastic films in one direction or both directions a predetermined amount to provide areas of various degrees of stretch, that may be observed and tested to determine the various degrees of molecular orientation which is best suited for the various uses for which it is intended.

The apparatus of the invention may be employed to determine to what extent the material may be stretchable to provide a stronger film and to increase the surface area while leaving sufficient residual stretch to resist shock or unevenness when used for package wrapping material and also to prevent any porosity so that an air-tight wrapping may be provided for foods or other perishable material. By stretching or tensilizing hydrochloride film to the proper degree a stronger, more stabilized film is produced and its surface area is greatly increased with the result a better wrapping material at less cost than film which has not been properly tensilized to the proper limits. The reduced cost is due to a saving in material.

A further object of the invention is achieved by providing a tensilizing device capable of stretching and stabilizing pieces of film of relative small area which may be observed and tested to determine the proper degree of stretch which will be best suited for the various uses for which it is intended. Although the present disclosure is intended for laboratory test work, the same principle may be adapted in commercial production for continuous operation.

These and other objects are achieved by providing an apparatus for tensilizing film, comprising a frame which in its normal position is in the form of a square. The frame is composed of a series of links or arms pivotally connected at each corner and at points midway thereof on each side.

By means of threaded nuts to which the mid-points are pivoted and screws the mid-points are retracted toward the center of the frame. The test film is clamped to these retracted points and by the manipulation of a clutch the arms are expanded to stretch the film in either direction consecutively or in both directions simultaneously.

For a better understanding of the invention, reference should be made to the accompanying drawings, wherein, Figure 1 is a plan view of the apparatus showing the arms in contracted position with some of the clamps in open and some in closed position;

Figure 3 is a side sectional view taken on the line 3—3 of Figure 2 showing the film in stretched condition;

Figure 4 is a fragmentary view taken on line 4—4 of Figure 2 showing the clamping and supporting means as related to the arms of the frame;

Figure 5 is a sectional view taken on the line 5—5 of Figure 2;

Figure 6 is a sectional view taken on the line 6—6 of Figure 2;

Figure 7 is a diagrammatic view of the heating oven with the tensilizing apparatus therein; and Figure 8 is a sample piece shown before and after tensilizing.

Figure 1:
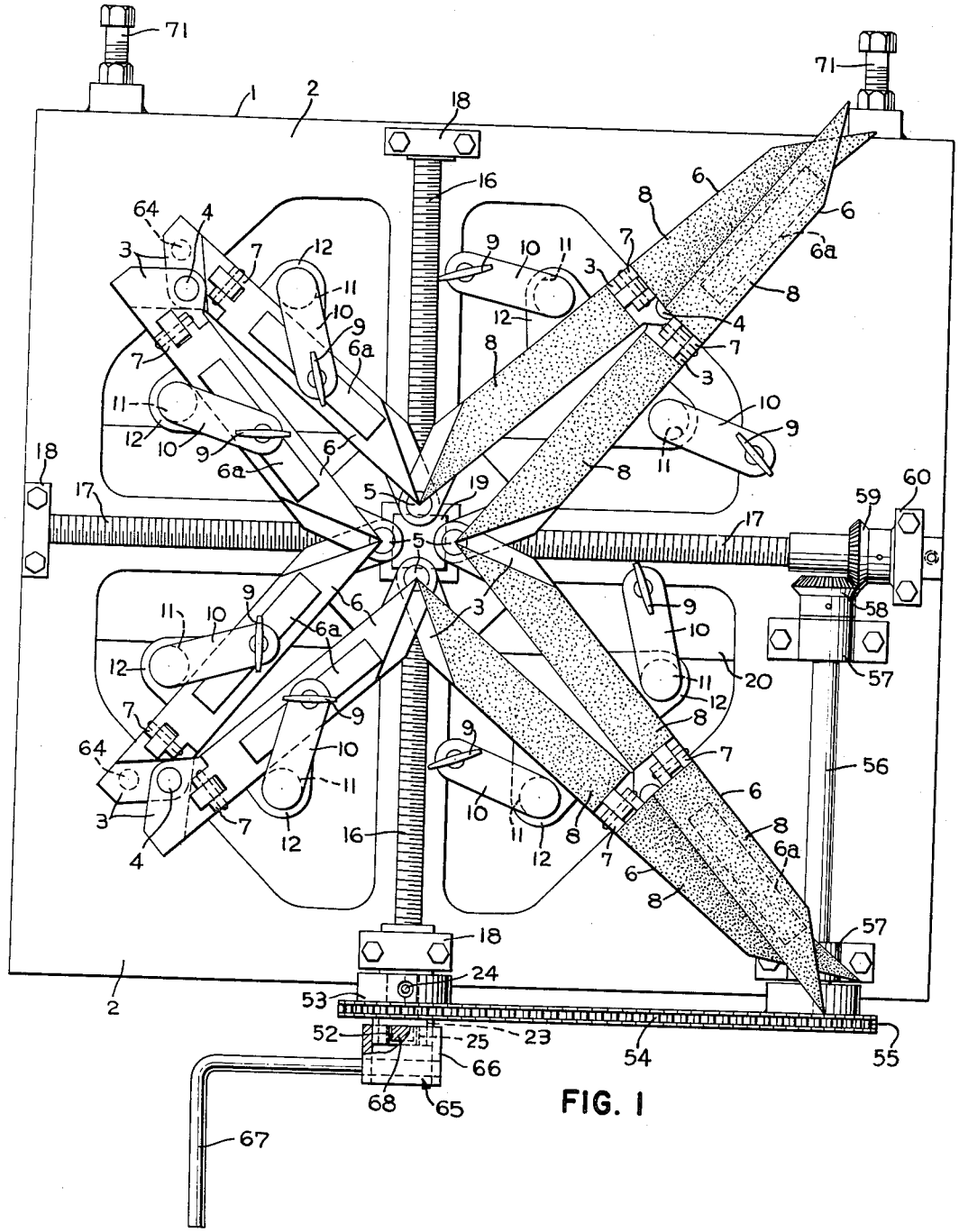

Referring to the drawings which illustrate one form of the invention, the apparatus comprises a base 1 consisting of angle iron having a plate 2 welded thereto, the plate having openings therein to assure free circulation of heat to both sides of the film while being tensilized.

Figure 2:
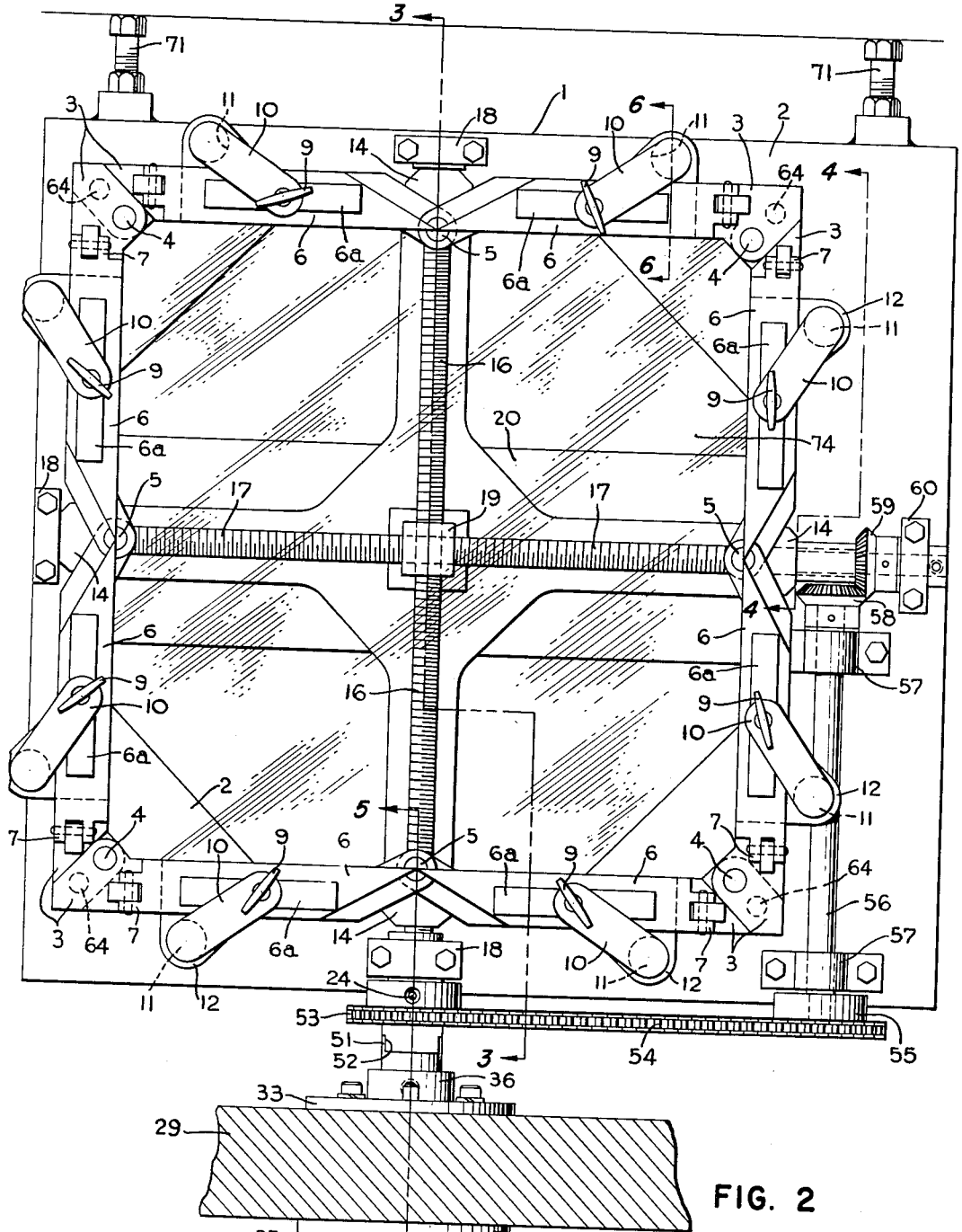
Figure 2 is a plan view showing the arms in expanded position.

Mounted on the base are a series of eight arms 3 hinged together as at 4 and 5 in articulated arrangement which, in their normal position, form a rectangle as illustrated in Fig. 2. Clamps 6 are hingedly attached to the arms 3 as at 7, both the arms 3 and the clamps 6 have a rubber covering 8 applied to their meeting surfaces to provide a substantially uniformly distributed clamping pressure over the entire clamped area of the material being stretched or tensilized.

The clamps 6 are secured in their clamping position by thumb screws 9 disposed in arms 10 having extensions 11 which are rotatably retained in lugs 12 secured to the under side of and extending laterally from the arms 3, by nuts 13. To prevent deflection of the clamps the screws 9 contact raised portions in the form of reinforcing cleats 6a which serve to prevent bending of the clamps 6 when in active position under pressure of the screws.

The rectangular frame formed by the arms 3 with the clamps 6 attached thereto are hinged at the corners and at points midway of the corners as at 4 and 5, this frame being retractable to clamp the test piece of film as in Fig. 1 and then expanded to extended position as in Fig. 2 in the following manner:

In order to contract the frame as illustrated in Fig. 1 the hinged ends of the arms 3 at the midpoints between the corners of the frame are supported by internally threaded nuts 14 which are slidable on the plate 2. The arms are pivotally mounted on the nuts 14 by the pivots 5 which are shouldered bolts secured in the nuts by set screws 15 (see Fig. 3). The threaded nuts 14, which are positioned opposite one another, are provided with right- and left-hand threads to receive shafts 16 and 17 which are rotatably mounted in fixed bearings 18 at their outer ends and in a central bearing 19 which is mounted on a plate 20 beneath plate 2, by a cap screw 21, said plate being supported on angle irons 22 secured to the angle irons 1 which support the plate 2.

The contracting and expanding of the frame is accomplished by the right- and left-hand screws of the shafts 16 and 17 revolving in corresponding threads of the right and left threaded nuts 14. This draws the nuts 14 carrying the pivots 5 of the articulated arms 3 with the clamping members 6 so that they converge centrally of the frame to permit clamping a test piece of the film thereto.

The threaded shafts 16 and 17 may be operated individually to tensilize a film in one direction or they may operate simultaneously to tensilize in all directions.

The threaded shaft 16 extends from the bearing 18 to receive a coupling member 23 attached to the shaft 16 by a pin 24 (see Fig. 5). The coupling member is provided with a groove 25 to receive a tongue 26 formed on a shaft 27 which rotates in a sleeve 28, which in turn is secured to a door 29 of an oven 30 in which the device is placed so the tensilizing may be done while the film is under the influence of heat within the oven.

The sleeve 28 is rotatably mounted in a flanged bushing 31 which extends through the door and is secured therein by screws 32 extending through the flange 33 formed on the bushing 31 and the door 29, to a collar 34 provided with threaded openings to receive the screws 32. The sleeve 28 is held in axial alinement by the flange 35 formed thereon and a collar 36 held in place on the sleeve by a set screw.

The shaft 27 at its outer end is provided with a reduced portion 37 on which is mounted an extension shaft 38 secured thereon by a pin 39. Rotatably and slidably mounted on the shaft 38, is a flanged disk 40 which is provided with a bushing 41 and a handle 42, the disk 40 being also provided with a bore 43 in which a pin 44 having protruding ends is secured by set screws 45.

The shaft 38 is provided with an integral flange 46 to retain thereon a disk 47 slidable on the shaft 38 but mounted to rotate therewith through the aid of a key 48, a bored opening 49 is provided for engagement of the pin 44 secured in the flanged disk 40 for the purpose now to be described.

When a test piece of film is to be tensilized in one direction only, one of the screws 16 or 17 is operated but if a two-way stretch is desired both screws are operated simultaneously.

To operate the screw 17, reference may be made to Figs. 2 and 5. The flanged disk 40 is shifted on the shaft 38 so that the pin 44 engages a bored hole 50 in the flange 35 of the sleeve 28 in this position the disk is turned in a clockwise direction which turns the sleeve 28.

Tongues 51 formed on the end of the sleeve 28 engages the grooves 52 formed on the hub of a sprocket wheel 53. The sprocket carries chain 54 which extends to and drives a sprocket 55 secured to a shaft 56 supported in bearings 57 mounted on the plate 2. Mounted on the opposite end of the shaft 56 a mitre gear 58 meshes with a mating gear 59 which is secured to the right- and left-hand screw 17 which is supported at its outer ends by a bearing 60 mounted on plate 2. By turning the disk 40 clockwise the mid-points of the opposite arms 3 (at the right and left in Fig. 2) may be expanded axially of the screw 17 and retracted toward the center by reverse movement of the disk 40.

When it is desired to operate only screw 16, the disk 40 is shifted to the left (see Fig. 5) so that the pin 44 engages the bore 49 of the disk 47. This disengages the pin 44 from the bore 50 in the flange 35 of the sleeve 28 and permits a pin 61 disposed in a bore 62 formed in the door 29 to be projected into the bore 50 in the flange 35 by means of a spring 63 to thus prevent turning of the disk 35. With the sleeve 28 locked in inactive position and the pin 44 in engagement with the flange 47, the flange 47 may be revolved by revolving the flange 40. This revolves the shafts 38 and 27 and the screw 16 by the engagement of the tongue 26 on shaft 27 with the groove 25 in the coupling 23 attached to the end of the screw shaft 16. By turning the flange 47 clockwise the opposite arms 3 may be moved to extended position at the bottom and top of Fig. 2 and by a reverse motion the arms may be contracted in the same manner as explained for the screw shaft 17.

The sprocket 53 is mounted on the coupling 23 in free running engagement and remains motionless during the separate operation of the screw shaft 16 due to the driving sleeve 28 being locked in inoperative position by the pin 61.

The arms at the corners of the frame are supported by studs 64 secured to the lowermost arms 3, and slide on the base plate 2 during contraction and expansion of the arms of the frame.

Both of the screws 16 and 17 may be operated simultaneously by the disk 40 simply by shifting the disk 40 so that one end of the pin 44 engages within the bored hole 50 in flange 35 of the sleeve 28 and the disk 47 shifted so that the other end of the pin 44 engages the bore 49. In this position both disks 40 and 47 may be revolved at the same time by the crank 42 mounted on disk 40.

In operation the apparatus is removed from the oven 30 placed on a bench and the frame contracted so that the mid-points converge at the center of the frame (see Fig. 1). This contraction is accomplished by a crank or wrench 65 as illustrated in Fig. 1. The crank comprises a tubular head 66 and an offset handle 67 to facilitate rotating same. The head is provided at its inner end with a cross-bar 68 which spans the opening in the head and engages the groove 25 of the coupling 23 and the groove 52 in the sprocket wheel 53.

With the arms retracted by the crank the clamping arms 3 are swung out of the way and a test piece of film 69 in the general form of a cross (Fig. 8) is positioned over the mid-points of the arms 3, the extending portions 70 in contact therewith. The film is clamped thereon by the clamps 6. The apparatus, with the arms in retracted position, the film clamped thereon and with the crank 65 removed, is then placed in the oven 30, and is guided between suitable guides into engagement with the adjustable stop studs 71 to properly aline the apparatus so that the driving mechanism attached to the door will make proper connection with the sprocket 53 and the coupling 23 when the door 29 of the oven is closed.

With the apparatus in the oven, heat may be applied to the desired degree by various means, preferably an electric coil 72 as illustrated in Fig. 7 in which the tensilizing unit is designated generally by the numeral 73.

When the proper temperature has been reached, the film is tensilized either in one direction or in all directions simultaneously by manipulating the driving means on the oven door as has previously been described. The degree of tensilizing is determined by the number of revolutions the screws are turned or by the distance the clamps are retracted before securing the film therein.

When the tensilizing is completed the apparatus is removed from the oven and the test piece of film removed, which when tensilized in all directions takes the form as illustrated by dotted lines as at 74 in Fig. 8.

From the foregoing it will be apparent that a tensilizing apparatus as disclosed herein is efficient, economical in operation and simple in construction. By its operation the strength, porosity, thickness and quality of the film may be determined and applied in commercial production, with the result that a better product is produced with a saving in material which will be reflected in cost of the product.

While certain representative embodiments and details have been shown for the purpose of illustrating the invention, it will be apparent to those skilled in the art that various changes and modifications may be made therein without departing from the spirit or scope of the invention.

I claim:

1. A device for tensilizing thermo-plastic film while under the influence of heat comprising a base, a series of articulated arms disposed on said base which in their normal position define a rectangular frame; said arms being pivotally connected at the corners of said rectangle and at points intermediate thereof; the frame being supported at the corners by supports slidable on said base and at the intermediate points by slidable nuts actuated by screws; bearings fixed to said base to support said screws; clamps hingedly mounted on said arms to clamp the film thereon; means for driving the screws to retract the arms centrally of the frame to clamp the film therein; means for heating the film; and means for reversing the driving means to extend the arms of the frame to tensilize the film while under the influence of said heat.

2. A device for tensilizing thermo-plastic film comprising a base, a series of arms mounted on said base, said arms being pivotally connected to form a rectangular frame in its normal position, the arms being pivotally connected at the corners of the frame and at points intermediate thereof, means to retract the arms at said intermediate points toward the center of the frame to receive the film to be tensilized, means to clamp the film to said arms, means for heating said films, and means to extend the arms of the frame a predetermined direction and distance while the film is under the influence of heat.

3. A device for tensilizing thermo-plastic film while under the influence of heat comprising a base; a plurality of articulated arms connected together and supported on said base so that they form a rectangular frame in their normal position; said arms being hinged at the corners of said frame and at points intermediate thereof; means for retracting and extending the arms of said frame; clamps hingedly mounted on said arms for clamping the film thereto when the arms are retracted; means for receiving the device with the film clamped thereon, said means comprising an oven having a door, driving means mounted on said door which engages the retracting and extending means and means for actuating said driving means.

4. An apparatus for tensilizing thermo-plastic film comprising a base, a frame supported on said base, said frame composed of arms hingedly connected in articulated rectangular formation when in a normal position, the arms being connected at the corners and at midpoints thereof, means for retracting and extending the arms centrally of the frame, means for clamping a film to said arms, means comprising a chamber having heating means therein, means in said chamber for positioning said apparatus, a door on said chamber, means for actuating the means for extending and retracting said arms disposed on said door, means for connecting said actuating means to said retracting and extending means and means shiftable on said actuating means to tensilize the film in varying degrees of direction and stretch.

5. An apparatus for tensilizing thermo-plastic film comprising a base, a frame supported on said base, said frame composed of arms pivotally connected in articulated rectangular formation in normal position, said arms being connected at the corners and at points intermediate thereof, movable supports for said arms at the pivotal points, screw shafts in engagement with the supports at the intermediate points to retract the arms at said intermediate points and to extend them into normal position, a heating chamber to receive the apparatus, a door on said chamber, a drive mounted on said door, and a coupling for connecting said drive with the screw shafts when the door is closed to actuate the screw shafts to retract and extend said arms.

6. An apparatus for tensilizing thermo-plastic film comprising a base, a frame supported on said base, said frame composed of arms pivotally connected in articulated rectangular formation in normal position, said arms connected at the corners of the frame and at points intermediate thereof, movable supports for said arms at the pivotal points, screw shafts in engagement with the supports at the intermediate points to retract the arms at said intermediate points toward the center of the frame and to extend them into normal position, clamps secured to said arms to clamp a film to said arms, resilient strips on the inner surface of said arms and clamps to grip the film, a heating chamber to receive the apparatus with the film clamped thereon, a door on said chamber, a drive mechanism mounted on said door, a coupling for connecting said drive with the screw shafts when the door of the chamber is closed and shiftable disks on said drive mechanism to control the direction and degree of stretch of the film.

7. Apparatus for tensilizing film or the like which comprises a series of articulated clamping members forming a substantially closed figure, the articulated members being pivotally movable in the same plane from a position in which they define a restricted area to a position defining a greater area and means to move said members in the same plane, whereby a film clamped thereby is stretched as the articulated clamping members are pivotally moved to a position to enclose the greater defined area.

8. A film-stretching apparatus comprising a plurality of interconnected links forming a closed figure of variable size, means mounting said links for pivotable movement in the plane of said links to change the defined area enclosed by said links, means to clamp a film to said links and means for actuating said mounting to selectively move certain of said mounting means to actuate certain ones of said links to thereby stretch the film.

9. A film-stretching apparatus comprising a plurality of interconnected links forming a closed figure of variable size, means mounting said links for pivotable movement in the plane of said links to change the defined area enclosed by said links, means to clamp a film to said links and means for actuating said mounting to move all of said links to simultaneously increase the area defined by said links in all directions to thereby stretch the film.

10. A film-stretching apparatus comprising a support, two opposed slidable members mounted on said support for movement toward and from each other along a given line, means for actuating said slidable members in opposite directions selectively toward or from each other, similar slidable members mounted for sliding movement on said support along a line at a substantial angle to said first-mentioned line, means for actuating said slidable members selectively in opposite directions toward and away from each other, a pivot on each of said slidable members, pairs of links each having adjacent ends thereof mounted on said pivot for articulated movement thereabout, the opposite ends of said links being pivoted to corresponding ends of adjacent links mounted on an adjacent pivot on another of said slidable members, means for maintaining all of said links in a plane during articulation thereof resulting from the movement of said sliding members during the actuation thereof, and means for clamping a film against all of the articulated links around a substantially continuous perimeter of a defined area of the film.

11. An apparatus as set forth in claim 10 in which the actuating means for the slidable members may be selectively independently or simultaneously operated to thereby stretch a film in one direction or another.

12. A film-testing apparatus comprising clamping members pivotably connected in a closed series for clasping a film along a substantially continuous perimeter of a defined area, means for moving some of said clamping members, a second means for moving others of said clamping members, and a means for selectively actuating either or both of said moving means, said actuating means having rotatable shafts adapted to move the links upon rotation of the shafts, releasable interconnecting means between said shafts, actuating means for selectively engaging means on one of said shafts to rotate it independently of the other, said means being also selectively engageable with the interconnecting means to actuate the interconnecting means to actuate the other of said shafts independently of said first shaft and said actuating means being also selectively positionable to simultaneously actuate said first shaft and through the intermediacy of the interconnecting means actuate the other shaft simultaneously, said actuating means comprising clutch means including three concentrically mounted rotatable members, two of which, when in operative position, are coupled directly to said first shaft and said interconnecting means directly and respectively, the third concentrically arranged member having releasable means engageable selectively with either of the other two concentrically mounted members or to both of same simultaneously for selectively driving either of the said shafts independently or both of said shafts simultaneously.

13. An apparatus as set forth in claim 12 in which the actuating means comprises rotatable shafts adapted to move the links upon rotation of the shafts, releasable interconnecting means between said shafts, actuating means for selectively engaging means on one of said shafts to rotate it independently of the other, said actuating means being also selectively engageable with the interconnecting means to actuate the interconnecting means to actuate the other of said shafts independently of said first shaft and said actuating means being also selectively positionable to simultaneously actuate said first shaft and through the intermediacy of the interconnecting means actuate the other shaft simultaneously.

References Cited in the file of this patent

UNITED STATES PATENTS

| | | |
|---|---|---|
| 442,135 | Peterson | Dec. 9, 1890 |
| 2,189,006 | Hutchinson | Feb. 6, 1940 |
| 2,342,977 | Snyder | Feb. 29, 1944 |
| 2,486,791 | Pfeiffer | Nov. 1, 1949 |
| 2,608,750 | Cluzel | Sept. 2, 1952 |